United States Patent
Geurts et al.

(10) Patent No.: US 8,898,569 B2
(45) Date of Patent: Nov. 25, 2014

(54) METHOD OF PRESENTING DIGITAL CONTENT

(75) Inventors: Lucas Jacobus Franciscus Geurts, Eindhoven (NL); Leendert Teunis Rozendaal, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 907 days.

(21) Appl. No.: 12/666,326

(22) PCT Filed: Jun. 23, 2008

(86) PCT No.: PCT/IB2008/052461
§ 371 (c)(1),
(2), (4) Date: Dec. 23, 2009

(87) PCT Pub. No.: WO2009/001271
PCT Pub. Date: Dec. 31, 2008

(65) Prior Publication Data
US 2010/0174990 A1     Jul. 8, 2010

(30) Foreign Application Priority Data
Jun. 28, 2007   (EP) ..................... 07111305

(51) Int. Cl.
*G06F 3/00*     (2006.01)
*G06F 17/30*    (2006.01)

(52) U.S. Cl.
CPC .............. *G06F 17/30056* (2013.01)
USPC ........................................ 715/730

(58) Field of Classification Search
CPC ................................ G06F 17/30056
USPC ........................................ 715/730
See application file for complete search history.

(56) References Cited

U.S. PATENT DOCUMENTS

| 4,748,756 A | 6/1988 | Ross |
| 7,107,605 B2 | 9/2006 | Janik |
| 7,155,679 B2 | 12/2006 | Bandaru et al. |

(Continued)

FOREIGN PATENT DOCUMENTS

| GB | 2393349 A | 3/2004 |
| WO | 0019294 A2 | 4/2000 |
| WO | 2006116580 A2 | 11/2006 |

OTHER PUBLICATIONS

Finke et al: "A Reference Architecture Supporting Hypervideo Content for ITV and the Internet Domain"; Computers and Graphics, vol. 28, No. 2, (2004), pp. 179-191.

(Continued)

*Primary Examiner* — Sara England (57) ABSTRACT

A method of presenting digital content includes obtaining digital data representative of a succession of content items and presenting the succession of content items in a first presentation mode. In the first presentation mode, steps of making a first selection of the data representing a content item and providing the selected data to a system for rendering the data in perceptible form are carried out automatically for each content item in succession. The method further includes detecting an action by a user at the rendering system and, in response to detecting the action, causing a transition to a second presentation mode, in which second presentation mode the rendering system is caused to render a second selection, different from the first selection, of only the data representing the content item being presented when the action was detected.

16 Claims, 4 Drawing Sheets

(56) References Cited

U.S. PATENT DOCUMENTS

| | | |
|---|---|---|
| 2002/0024538 A1 | 2/2002 | Bandaru et al. |
| 2005/0012758 A1 | 1/2005 | Christou |
| 2005/0212755 A1* | 9/2005 | Marvit .......................... 345/156 |
| 2005/0225647 A1 | 10/2005 | Gossweiler, III et al. |
| 2006/0190836 A1* | 8/2006 | Ling Su et al. ................ 715/773 |
| 2007/0287477 A1* | 12/2007 | Tran .............................. 455/466 |
| 2008/0036894 A1* | 2/2008 | Alsaud ..................... 348/333.01 |
| 2008/0126928 A1* | 5/2008 | de Leon et al. ................ 715/700 |
| 2008/0294640 A1* | 11/2008 | Yost et al. .......................... 707/9 |
| 2009/0079765 A1* | 3/2009 | Hoover ......................... 345/660 |

OTHER PUBLICATIONS

Curran et al: "Scheduled RSS Feeds for Straming Multimedia to the Desktop Using RSS Enclosures"; Consumer Communications and Networking Conference, 2006, IEE, vol. 1, Jan. 2006, pp. 267-271.

* cited by examiner

METHOD OF PRESENTING DIGITAL CONTENT

FIELD OF THE INVENTION

The invention relates to a method of presenting digital content, including:
obtaining a stream of digital data representative of a succession of content items;
presenting the succession of content items in a first presentation mode, in which first presentation mode
steps of making a first selection of the data representing a content item and providing the selected data to a system for rendering the data in perceptible form are carried out automatically for each content item in succession; and
detecting an action by a user at the rendering system.

The invention also relates to a system for presenting digital content, including
a data processing apparatus having an input for receiving a stream of digital data representative of a succession of content items;
a rendering system including at least one device for rendering content data in perceptible form; and
a detector for detecting an action by a user,
which system for presenting digital content is configured to operate in a first presentation mode in which first presentation mode the data processing apparatus automatically carries out the steps of making a first selection of the data representing a content item and providing the selected data to the rendering system for each content item in succession.

The invention also relates to a computer programme.

BACKGROUND OF THE INVENTION

US 2002/0024538 discloses a portable digital media frame (DMF) that displays images. An embodiment of the DMF architecture includes an image input block, an image processing block and an image displaying block. The image processing block contains an analogue module, a digital module, a processing block, a user input unit, a dynamic random access memory, a non-volatile memory unit, a read only memory and an internal bus. The processing unit is capable of receiving a predetermined sequence of images to be displayed from an external input device, such as a computer. Moreover, a sequence of images to be displayed may be altered by control signals from a user, such as a pause signal from the user-input unit.

A problem of the known device is that each of the sequence of images is presented to the required level of detail of the image at which the sequence is paused. This is unlikely to be what is desired, because either the images in the sequence will be displayed fully and at a high resolution so that the sequence is displayed slowly, or the image at which the sequence is paused will be rather coarse.

SUMMARY OF THE INVENTION

It is an object of the invention to provide a method, system and computer programme of the types mentioned above, that allow a succession of relatively elaborate content items to be presented in such a way that a user can be attracted to and experience one of them in appropriate ways with relatively little interaction.

This object is achieved by the method according to the invention by, in response to detecting the action, causing a transition to a second presentation mode, in which second presentation mode the rendering system is caused to render a second selection, different from the first selection, of only the data representing the content item being presented when the action was detected.

Because steps of making a first selection of the data representing a content item and providing the selected data to a system for rendering the data in perceptible form are carried out automatically for each content item in succession in the first presentation mode, the transition from one content item to the next requires no user interaction. Because the rendering system is caused to render a selection of only the data representing the content item being presented when an action by the user was detected, the automatic progression from one content item to the next in succession is halted by the user's action. Because the same action also leads to the transition to a second presentation mode in which a different selection of the data is caused to be rendered than in the first presentation mode, no further user interaction is required to render the content item in the most appropriate way to each state, i.e. the state of only observing content items to an extent sufficient to make a selection and the state of experiencing one of the content items in more depth.

In an embodiment, the digital data representative of a content item includes data of at least two different types, each rendered in perceptible form in an associated manner, wherein data representing the content item is included in at least one of the first and second selection according to its type.

An effect is to enable appropriate selections for providing a quick overview and an in-depth experience to be made. This is because the type of data determines how it is rendered in perceptible form, and because how data is rendered in perceptible form generally affects how it is perceived.

In an embodiment, wherein data representing a content item includes digital image data and character encoded data, one of the digital image data and character encoded data is included in only one of the first and second selections and caused to be displayed on a screen by a display device.

This implementation allows for data that is unlikely to be perceived or required, to be omitted in the first presentation mode, for example. This could be the digital image data, where the images are detailed, or the character encoded data. The latter would be the case where images are accompanied by large amounts of text, or encoded audio.

In an embodiment, at least parts of the data of the first and second selection are provided to a display device for display on a screen, and the display device is caused to display content represented by the data from the first selection in a same area of the screen as content represented by the data from the second selection.

Thus, this embodiment makes efficient use of the available screen area, to display a first selection that can register with the user quickly in the first presentation mode. A selection that allows the information of interest in a content item to be perceived fully when more time is available can be made in the second presentation mode.

In an embodiment, the second selection includes the data of the first selection and additional data.

This embodiment makes it possible to render data representing the content items in quick succession in the first mode without heavy data processing requirements. Detail not likely to be perceived in the first presentation mode is added in the second presentation mode to enhance the user experience.

In an embodiment, in the second presentation mode, a rendition of the second selection replaces a rendition of the first selection by the system for rendering the data in perceptible form.

This embodiment avoids unnecessary redundancies in the data that is rendered in perceptible form.

In an embodiment, the data representative of a succession of content items is received as a mixed content digital data feed, preferably a feed in RSS format.

Thus, in the first presentation mode, the order of succession of the content items is determined by the order in which content is provided at the server providing the feed. At least the relative timing of the transition from one content item to the next is also determined, by the frequency with which new content is made available. The mixed content provides a pre-determined partition into data of several different types, making different selections relatively easy to make.

An embodiment includes, during a transition between the first and the second presentation mode, causing the system for rendering the data in perceptible form to render a blend of the data comprised in the first selection and data comprised in the second selection according to an algorithm.

Thus, the transitions between presenting content items in succession and presenting only one content item are made more appealing to the user. Abrupt "freezing" of the process of rendering data in perceptible form is avoided, as are abrupt changes between rendering one aspect of content items to another aspect of a chosen content item.

In a variant, the system for rendering the data in perceptible form is caused to render a time-varying blend of the data over a time interval within a duration of the transition.

This variant further enhances the user experience.

An embodiment of the method includes receiving a trigger and, responsive to the trigger, causing a transition from the second presentation mode to the first presentation mode.

Thus, it is possible to return to a mode in which content items are presented in succession after a particular content item has been presented over a certain time interval and in a different way. This return requires but a single trigger.

In an embodiment, the trigger is caused by a signal from one of:
- a timing mechanism started at the transition from the first to the second presentation mode and
- a detector for detecting an action by a user at the rendering system.

Each of the options enables the return to the first presentation mode to be brought about with relatively little user interaction. The interface to a system configured to carry out the method is thereby simplified.

In an embodiment, an action by the user is detected by means of a signal from a contactless sensor.

An effect is that the method can be implemented in an apparatus without elaborate user controls. Direct physical interaction with the user is avoided.

In an embodiment, the system for rendering the data in perceptible form includes a portable device, wherein an action by the user is detected by means of a signal from a sensor for detecting a displacement of the portable device.

This embodiment represents a relatively simple and intuitive way for the user to indicate interest and/or loss of interest in a particular one of the succession of content items. For example, the action of picking up the portable device would be enough to signal interest, whereas putting it down would signal a loss of interest.

According to another aspect, the system for presenting digital content according to the invention is configured, when triggered by the detector, to carry out a transition to a second presentation mode in which second presentation mode a second selection, different from the first selection, of only the data representing the content item being presented at receipt of the trigger is rendered in perceptible form.

An embodiment of the system is configured to carry out a method according to the invention.

According to another aspect of the invention, there is provided a computer programme including a set of instructions capable, when incorporated in a machine-readable medium, of causing a system having information processing capabilities and in communication with a system for rendering data representative of digital content in perceptible form to perform a method according to the invention.

DETAILED DESCRIPTION OF THE DRAWINGS

The invention will now be explained in further detail with reference to the accompanying drawings, in which.

DETAILED DESCRIPTION OF THE EMBODIMENTS

Figure 1:
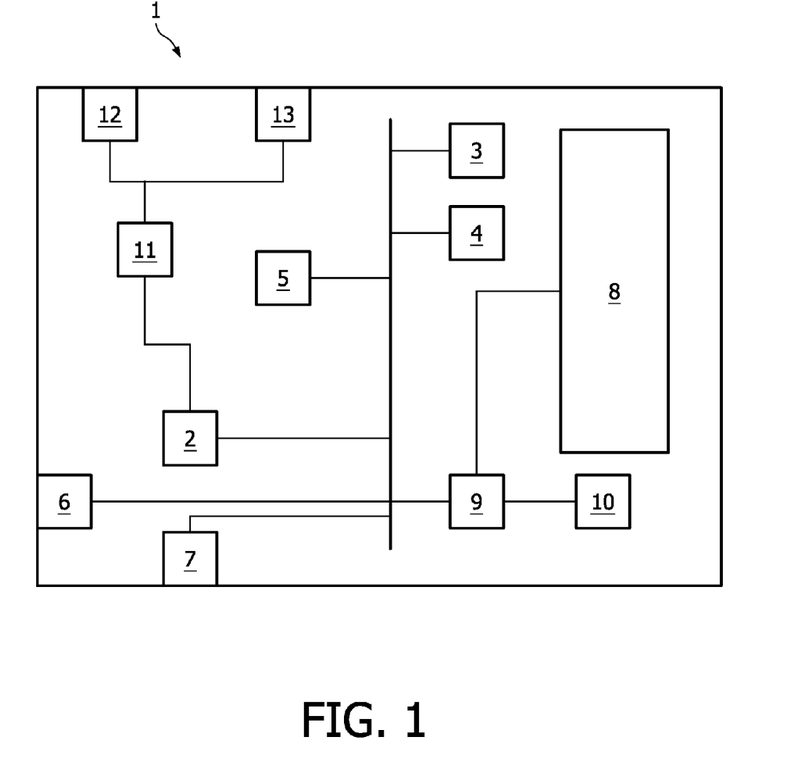
FIG. 1 is a block diagram of a digital picture frame.

A digital picture frame 1 is used herein as an example of an apparatus comprising a system for presenting digital content. Other suitable examples include a tablet personal computer, a personal digital assistant and a personal computer comprising a screensaver. The digital picture frame 1 includes a central processing unit (CPU) 2 and main memory 3. The digital picture frame 1 further includes non-volatile memory 4 and a disk drive 5 for permanently storing data. In particular, one or both of the non-volatile memory 4 and the internal disk drive 5 is configured to store software enabling the CPU 2 to control the presentation of a succession of content items on the digital picture frame 1.

The digital picture frame 1 is able to obtain digital data representative of the content items through external interfaces as well as by reading them from storage in the non-volatile memory 4 or internal disk drive 5. Examples of such external interfaces include a network adapter 6 and an external data port 7. The network adapter 6 may be a wired or wireless network adapter, e.g. conformant to an IEEE 802.11 standard or IEEE 802.16. It may also be an adapter for a personal area network, such as Bluetooth. In yet another embodiment, the network adapter 6 is implemented as a modem and cellular telephone transceiver. The external data port 7 can be implemented as a data port for exchanging data with a portable solid-state memory device, e.g. a USB memory stick or flash memory card.

In the examples used herein, the data representing each content item includes data that can be rendered in a visible form on a screen 8 of a display device comprised in the digital picture frame 1. The display device further includes a display controller 9 and video data memory 10. In the present example, the data representing a content item include both digital image data and character encoded data. Each content item includes at least a digital image, and at least some content items additionally include text to be displayed with the digital image. It is observed that the data may be organised such that the data representing the digital image is provided with a link to data representing the text. In other embodiments, the data representing a content item may also or alternatively include data that can be rendered in an audible form on a suitable audio device (not shown). To this end, the data representing a content item may include audio data, or it may include text that is rendered in audible form using speech synthesis software. The image data is of a different type than the character encoded data, because the image is not encoded as characters but as a bitmap or vector graphic. The character encoded data includes the text to be displayed and formatting characters.

In the example described herein in most detail, the data representing content items are organised into files with the image data embedded in the file. A suitable file format is Hypertext Markup Language (HTML) or eXtensible Markup Language (XML). As mentioned, it is also possible to provide image files with a link to files containing data of a different type, e.g. text or audio data.

In the illustrated embodiment, the digital picture frame 1 further includes an interface 11 to a contactless sensor 12 and a displacement detector 13. Each of the contactless sensor 12 and displacement detector 13 is capable of detecting an action by a user within the immediate environment of the digital picture frame 1. The action by the user may involve manipulation of the complete digital picture frame 1, which is after all a portable device comprising the rendering system. The action may also comprise an action by the user involving no direct manipulation of any part of the digital picture frame 1, such as approaching or walking away from it, making a particular gesture in its immediate vicinity, entering a particular area adjacent the digital picture frame 1, etc. All these actions detected by either the contactless sensor 12 or displacement detector 13 comprise actions other than manipulation of data entry devices such as keys, buttons, including soft buttons, or the like. In alternative embodiments, one or the other of the contactless sensor 12 and displacement detector 13 may be dispensed with.

Figure 2A:
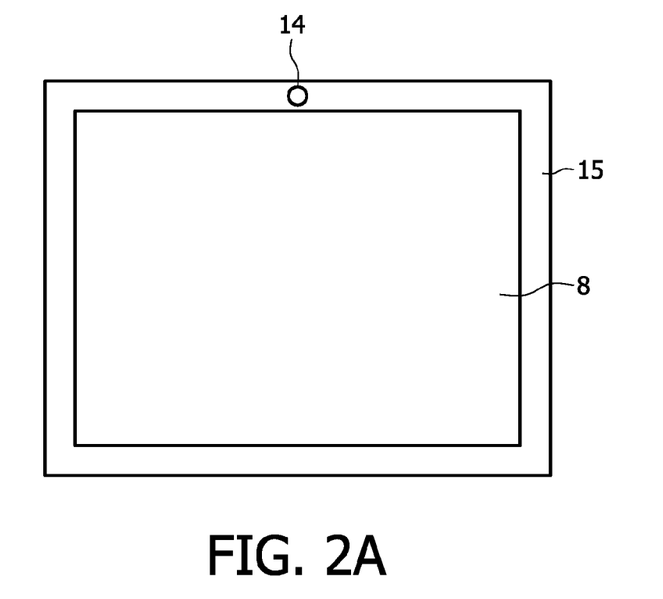
FIG. 2A is schematic frontal view of the digital picture frame.

The contactless sensor 12 may be capable of detecting human motion and/or proximity. In the illustrated example, the contactless sensor 12 comprises a wireless transceiver 14 (FIG. 2A) mounted on the front of a decorative frame 15 surrounding the screen 8. The wireless transceiver 14 can be an infrared transceiver or ultra-sound transceiver, for instance. In a more elaborate embodiment, the contactless sensor 12 may comprise an image capturing device arranged to provide a signal to image recognition software executed by the CPU 2.

Figure 2B:
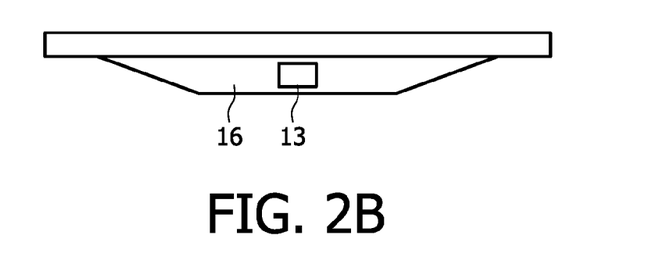
FIG. 2B is a schematic bottom view of the digital picture frame.

The illustrated displacement detector 13 comprises a pressure-sensitive element or a switch, mounted on a side of a support 16 arranged to contact a surface on which the digital picture frame 1 is placed, in use. Thus, the displacement detector 13 is capable of detecting the placement on or removal from the surface supporting the digital picture frame 1. A similar detector can be attached to a wire or hook at the back of the digital picture frame 1 if it is arranged to be suspended on a wall. An alternative type of displacement detector would be an inertial detector arranged to detect movement of the digital picture frame 1. Another alternative would be a detector involving a pendulum or similar mechanism for detecting a change in orientation of the digital picture frame 1.

Figure 3A:
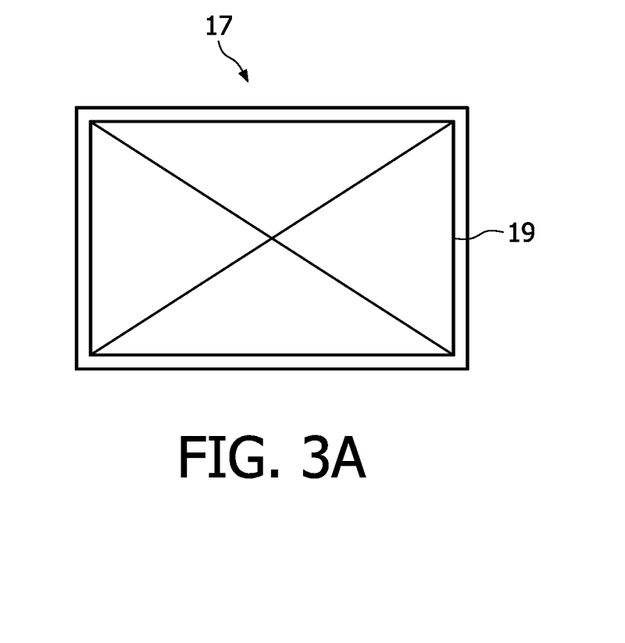
FIG. 3A is a schematic screen view in a first mode of presenting data from a feed.
Figure 3B:
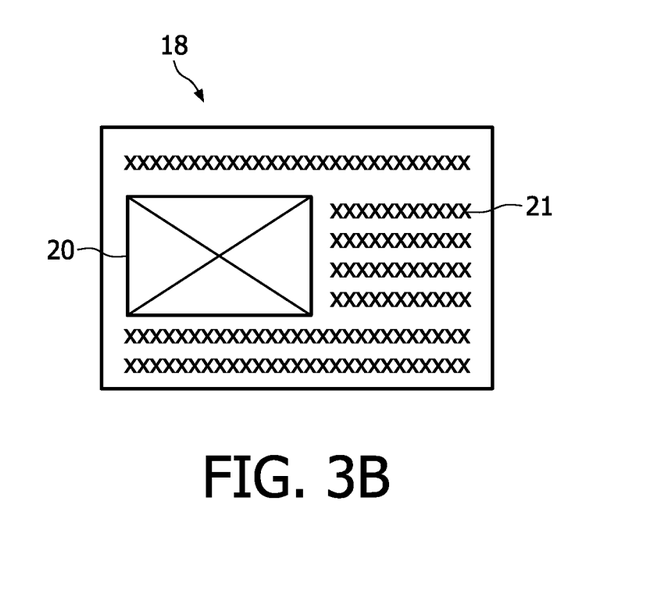
FIG. 3B is a schematic screen view in a second mode of presenting data from a feed.

An embodiment of a method of presenting a succession of content items on the screen 8 of the digital picture frame 1 will now be explained with reference to FIGS. 3A and 3B in conjunction with FIG. 4. For this example, it will be assumed that a feed aggregator is installed on the digital picture frame 1. The feed aggregator enables the digital picture frame 1 to retrieve a mixed content digital data feed from a particular location on a network. For example, web-sites exist that allow digital photos to be posted and then provided to the digital picture frame 1 as a feed. Similarly, Weblogs or news providers provide a mixed feed containing photos and accompanying textual information to subscribers. The feed may be provided in RSS 1.*, RSS 2.* or Atom format, for instance. The feed aggregator periodically checks whether a feed provider at a location it has been configured to obtain the feed from has new content available for download since it last checked. If that is the case, the data representing the content item is downloaded through the network adapter 6.

The example of a news feed will be used herein. As new news items are added by the provider and retrieved by the digital picture frame 1, they are automatically obtained in a particular order. In alternative embodiments, the digital picture frame 1 may be configured to order the news item according to a certain algorithm.

It is envisaged that each news item will comprise a digital photo or similar image and accompanying text, but that not every news item will be of interest to a user. For this reason, the digital picture frame 1 is capable of switching between a presentation mode, illustrated by means of a first screen view 17 in FIG. 3A, and a presentation mode, illustrated by a second screen view 18 in FIG. 3B.

The first screen view 17 contains only an enlarged image 19 from each new item in succession. The second screen view 18 includes an originally sized image 20 and accompanying text 21. The second screen view 18 is a perceptible rendition of a current news item, and does not change to a next news item.

Figure 4:
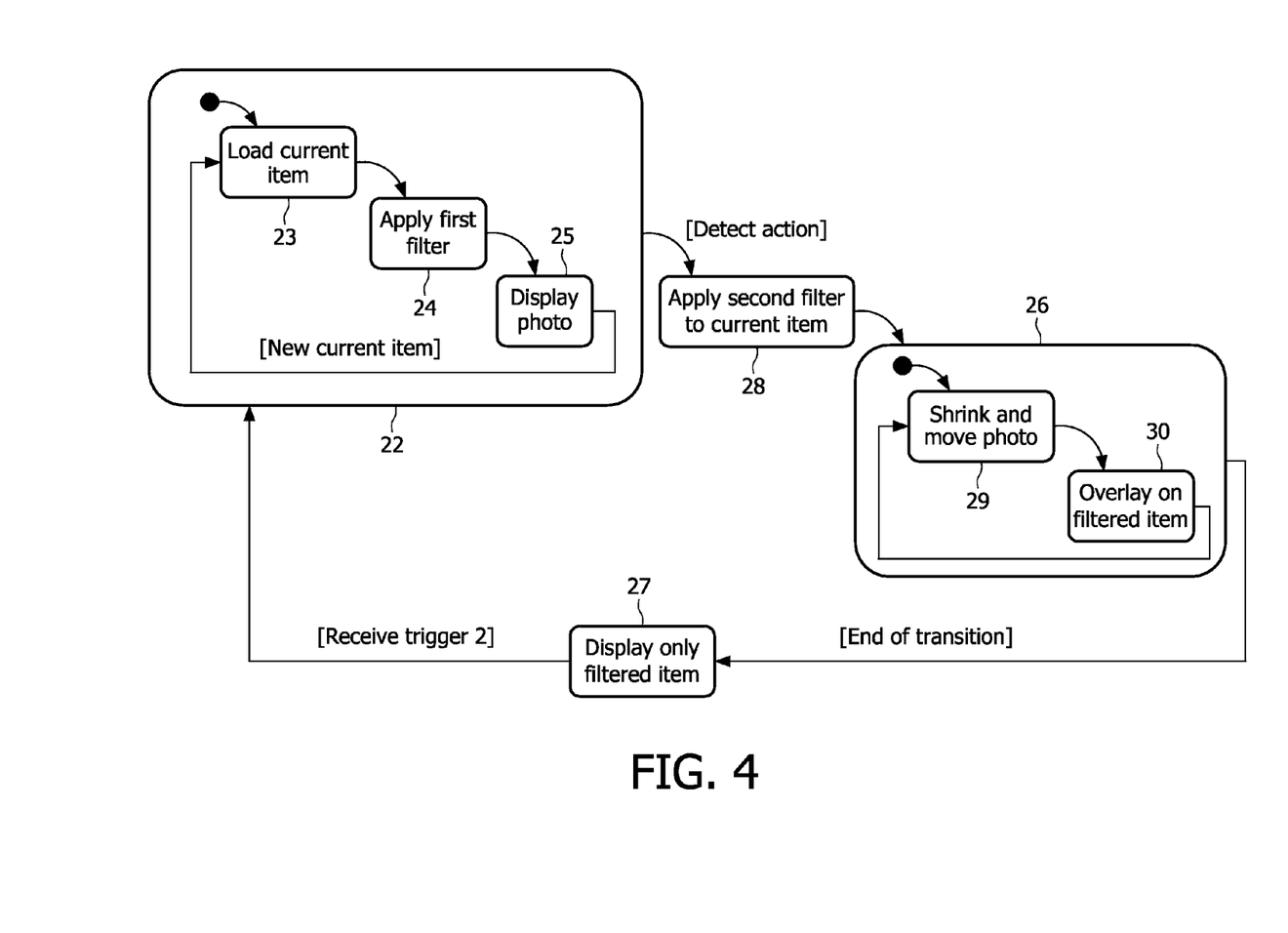
FIG. 4 is a state diagram illustrating the operation of the digital picture frame.

Thus, referring to FIG. 4, in a first presentation mode 22, the digital picture frame 1 automatically carries out steps of loading data representing a current news item (step 23), applying (step 24) a first filter to extract the digital image data embedded in the data representing the current news item and providing (step 25) the digital image data to the display controller 9 so as to obtain the first screen view 17, in which the digital image is displayed across the entire area of the screen 8. These steps 23,24,25 are automatically repeated as a new news item becomes available and becomes the next current item.

Upon detecting an action of the user by means of a signal from the contactless sensor 12 or the displacement detector 13, the digital picture frame 1 enters a transition state 26, and from there enters a second presentation mode 27, in which only data representing the current news item is displayed, and in the format exemplified by the second screen view 18.

In detail, the detection of an action by the user results in the application (step 28) of a second filter to the data representing the news item that was the current news item at the time the action was detected. This step 28 involves making a different selection of the set of all data representing the news item than made in the corresponding step 24 in the first presentation mode 22.

The selection made in this step 28 is based on the types of the data present in the current content item. In the example, it will generally be the case that, where both image data and text are included in the data representing the current content item, the second selection will include both, whereas the first includes only the image data. However, in another embodiment, the selection made in the first presentation mode 22 includes both digital image data and at least some of the character encoded data, whereas the selection displayed in the second presentation mode 27 includes only digital image data. In that embodiment, similar effects to the present embodiment are achieved in that the step 24 of applying the first filter includes selecting a sub-set of the digital image data to decrease the resolution with which the digital image is displayed in the subsequent step 25. However, in the embodiment discussed with reference to FIGS. 3A and 3B, it will be the case that the second selection includes the data of the first selection and additional data.

As illustrated in FIG. 4, the transition state includes repeated steps 29,30 of causing a time-varying blend of the data comprised in the first selection and the data comprised in the second selection to be displayed on the screen 8. Particular, the image of the current news item decreases in size from that of the enlarged image 19 to that of the originally sized image 20 and moves to its final position as pictured in FIG. 3B. The transition state 26 thus has the effect of making the change on the screen 8 less abrupt.

The digital picture frame 1 makes the transition back from the second presentation mode 27 to the first presentation mode 22 upon receipt of an internally generated trigger. In one embodiment, the digital picture frame 1 includes a timing mechanism, which is started at the transition from the first presentation mode 22 to the second presentation mode 27, e.g. when the action by the user is detected or when the second presentation mode 27 commences after the transition state 26 has been left. The timing mechanism could be implemented in software, and use an internal clock regulating the execution of instructions by the CPU 2. In an alternative embodiment, one or both of the contactless sensor 12 and the displacement detector 13 are used to generate a trigger when they detect an action by the user. In an embodiment in which detection of the picking up of the digital picture frame 1 by the displacement detector 13 results in the transition from the first presentation mode 22 to the second presentation mode 27, detection of the placing down of the digital picture frame 1 by the same displacement detector 13 could serve as the trigger for the transition back to the first presentation mode 22. In an embodiment where detection of the approach of the user by means of the contactless sensor 12 results in the transition from the first presentation mode 22 to the second presentation mode 27, detection of movement away from the digital picture frame 1 could serve as the trigger for the transition back to the first presentation mode 22.

The effect of this feature is similar to the effect achieved by causing the transition from the first presentation mode 22 to the second presentation mode 27, namely that the parts of the content item appropriate to the level of interest indicated by the user are displayed with minimal user interaction.

It should be noted that the embodiments described above illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

'Means', as will be apparent to a person skilled in the art, are meant to include any hardware (such as separate or integrated circuits or electronic elements) or software (such as programs or parts of programs) which perform in operation or are designed to perform a specified function, be it solely or in conjunction with other functions, be it in isolation or in co-operation with other elements. 'Computer program' is to be understood to mean any software product stored on a computer-readable medium, such as an optical disk, downloadable via a network, such as the Internet, or marketable in any other manner.

The invention claimed is:

1. A method of presenting digital content comprising the acts of:
obtaining digital data representative of a succession of content items;
presenting, by a processor, the succession of content items in a first presentation mode;
in the first presentation mode, automatically making a first selection of data representing a content item and automatically providing the selected data to a system for rendering the selected data in perceptible form for each content item in the succession of content items, wherein the system for rendering the data in perceptible form includes a portable device;
detecting an action by a user at the rendering system;
in response to the act of detecting the action, causing a transition to a second presentation mode, wherein in the second presentation mode the rendering system is caused to render a second selection, different from the first selection, of rendered data representing the content item being presented when the action was detected;
detecting by a sensor placement of the portable device on a surface; and
in response to the act of detecting by the sensor, transitioning back from the second presentation mode to the first presentation mode,
wherein data representing a content item includes digital image data and character encoded data, wherein the first presentation mode includes displaying on a display device only the digital image data and the second presentation mode includes displaying on the display device both the digital image data and additional data including the character encoded data, and wherein the second presentation mode includes shrinking and moving the digital image data and displaying the additional data along with the shrunk and moved digital image data.

2. The method according to claim 1, wherein the digital data representative of a content item includes data of at least two different types, each rendered in perceptible form in an associated manner, wherein data representing the content item is included in at least one of the first selection and the second selection according to its type.

3. The method according to claim 1, wherein at least parts of the data of the first selection and the second selection are provided to a display device for display on a screen, and wherein the display device is caused to display content represented by the data from the first selection in a same area of the screen as content represented by the data from the second selection.

4. The method according to claim 1, wherein, in the second presentation mode, a rendition of the second selection replaces a rendition of the first selection by the system for rendering the data in perceptible form.

5. The method according to claim 1, wherein the data representative of the succession of content items is received as a mixed content digital data feed.

6. The method according to claim 1 further comprising the act of, during a transition between the first presentation mode and the second presentation mode, causing the system for rendering the data in perceptible form to render a blend of the data comprised in the first selection and data comprised in the second selection according to an algorithm.

7. The method according to claim 6, wherein the system for rendering the data in perceptible form is caused to render a time-varying blend of the data over a time interval within a duration of the transition.

8. The method according to claim 1, further comprising the acts of receiving a trigger and, responsive to the trigger, causing a transition from the second presentation mode to the first presentation mode.

9. The method according to claim 8, wherein the trigger is caused by a signal from one of:
   a timing mechanism started at the transition from the first to the second presentation mode; and
   a detector for detecting an action by a user at the rendering system.

10. The method according to claim 1, wherein an action by the user is detected by a signal from a contactless sensor.

11. A non-transitory computer readable medium embodying computer instructions which, when executed by a processor, configure the processor to perform the method of claim 1.

12. The method of claim 1, further comprising the acts of:
   detecting movement of the user away from the rendering system; and
   in response to the movement detecting act, transitioning back from the second to presentation mode the first presentation mode.

13. A system for presenting digital content including a portable device comprising:
   a data processing apparatus having an input for receiving digital data representative of a succession of content items;
   a rendering system including at least one device for rendering content data in perceptible form;
   a detector for detecting an action by a user; and
   a sensor for detecting placement of the portable device on a surface
      wherein the system for presenting digital content is configured to operate in a first presentation mode, wherein in the first presentation mode, the data processing apparatus automatically carries out making a first selection of the data representing a content item and providing the selected data to the rendering system for each content item in succession,
      wherein the system for presenting digital content is further configured, when triggered by the detector, to carry out a transition to a second presentation mode, wherein in the second presentation mode a second selection, different from the first selection, of rendered data representing the content item being presented at receipt of the trigger is rendered in perceptible form;
      wherein, in response to detecting by the sensor placement of the portable device on the surface, the system for presenting digital content is further configured to transition back from the second presentation mode to the first presentation mode,
      wherein data representing a content item includes digital image data and character encoded data, wherein the first presentation mode includes displaying on a display device only the digital image data and the second presentation mode includes displaying on the display device both the digital image data and additional data including the character encoded data, and
      wherein the second presentation mode, the system for presenting digital content is further configured to shrink and move the digital image data and display the additional data along with the shrunk and moved digital image data.

14. The system of claim 13, wherein the detector is configured to detect movement of the user away from the rendering system and, in response to the detection that the user moved away, transitioning back from the second to presentation mode the first presentation mode.

15. A system for presenting digital content comprising a processor and a memory including instructions when executed by the processor, configure the processor to perform the acts of:
   obtaining digital data representative of a succession of content items;
   presenting the succession of content items in a first presentation mode on a portable device;
   in the first presentation mode, automatically making a first selection of the data representing a content item and automatically providing the selected data to a system for rendering the data in perceptible form for each content item in the succession of content items;
   detecting an action by a user at the rendering system;
   in response to detecting the action, causing a transition to a second presentation mode, wherein in the second presentation mode the rendering system is caused to render a second selection, different from the first selection, of only rendered data representing the content item being presented when the action was detected;
   detecting by a sensor placement of the portable device on a surface; and
   in response to the act of detecting by the sensor, transitioning back from the second presentation mode to the first presentation mode,
   wherein data representing a content item includes digital image data and character encoded data,
   wherein the first presentation mode includes displaying on a display device only the digital image data and the second presentation mode includes displaying on the display device both the digital image data and additional data including the character encoded data, and
   wherein the second presentation mode, the processor is further configured to shrink and move the digital image data and display the additional data along with the shrunk and moved digital image data.

16. The system of claim 15, further comprising a detector configured to detect movement of the user away from the rendering system and, in response to the detection that the user moved away, transitioning back from the second to presentation mode the first presentation mode.

* * * * *